July 27, 1948.  E. G. MITCHELL ET AL  2,445,858

LAMINATED STRUCTURE

Filed July 1, 1943

INVENTORS
Edmund G. Mitchell & De Witton B. Timberman
BY Lionel E. Goff
ATTORNEY Patented July 27, 1948

2,445,858

UNITED STATES PATENT OFFICE 2,445,858

LAMINATED STRUCTURE

Edmund G. Mitchell, Godfrey, and De Wilton B. Timberman, Alton, Ill., assignors to Olin Industries, Inc., a corporation of Delaware Application July 1, 1943, Serial No. 493,150

8 Claims. (Cl. 29—194)

This invention relates to composite laminated structures and particularly to a novel metal structure having a surface layer of a copper-phosphorus brazing alloy. The process of forming the novel metal structure of this invention is described and claimed in our co-pending application, Serial No. 2635, filed January 16, 1948.

Copper-phosphorus brazing alloy has long been known in the art and in its simplest composition consists of a copper base alloy containing about 2% to 10% of phosphorus, about 8.3% phosphorus being preferred since this composition forms a eutectic alloy melting at the relatively low temperature of about 707° C.

Heretofore, such alloy has been used as a brazing solder in the form of rod or wire. The use of such rod or wire has been attended by the disadvantage that it is of extremely brittle character and even a slight bending in some instances is sufficient to cause it to crack and shatter, thus making it very difficult to apply. The alloy has also been prepared in the form of a thin strip or sheet for insertion between the metal parts to be brazed, but this method of applications has also been attended by disadvantages, such as the difficulty in working the alloy into thin strips of sufficient width, brittleness of the strip, difficulty in manipulating such insertions, and the like, all detracting from its usefulness.

The application of copper-phosphorus alloy in brazing operations has accordingly presented many difficulties and it is an object of this invention to provide a novel method of application of the alloy free of such disadvantages.

Another object of the invention is to provide a novel composite laminated metal structure.

Another object of the invention is to provide a novel laminated metal sheet adapted for further working into shapes designed to form parts of composite articles.

Another object of the invention is to provide copper-phosphorus alloy in a form facilitating its use as a brazing solder.

Figure 1:
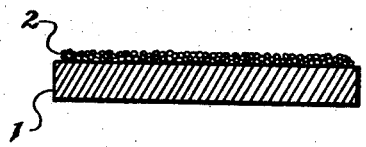
Figure 2:
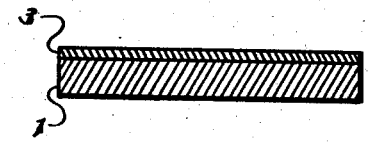
Figure 3:
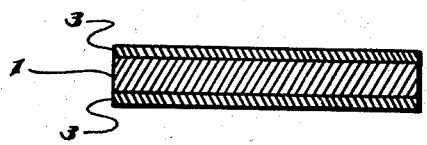
Figure 4:
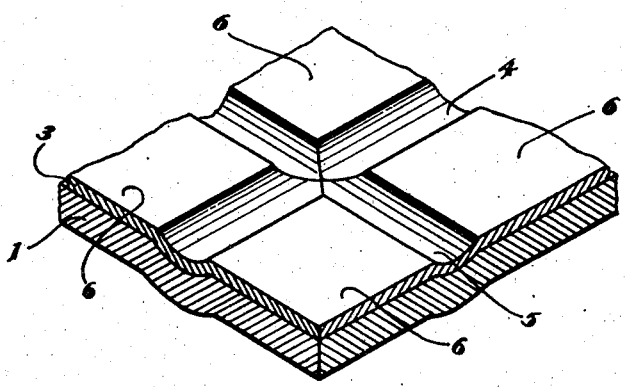

Other objects and advantages will be apparent from the following detail description and drawing, in which Figure 1 is a sectional view of a metal sheet illustrating the first stage in the formation of a laminated metal sheet according to one embodiment of this invention, and Figure 2 is a sectional view of a laminated metal sheet illustrating one embodiment of the invention, and Figure 3 is a sectional view of a laminated metal sheet illustrating another embodiment of the invention, and Figure 4 is a sectional view of a metal structure illustrating another embodiment of the invention.

The above objects and advantages are accomplished in accordance with this invention by the provision of a surface layer of copper-phosphorus brazing alloy on at least one of a plurality of copper-base metal parts which are to be joined by brazing, or spot-welding, and the like. It has now been found that the disadvantages ordinarily resulting from the inherent brittleness of the brazing alloy are overcome when the brazing alloy is utilized as an adherent surface layer on the metal structures to be joined since mechanical handling of the brazing alloy as such in the brazing operation is thereby obviated. Further in the very thin surface layer needed for the brazing operation the alloy assumes a flexibility and ductility not available with thicker sections or pieces, acting in this respect somewhat similar to such brittle materials as glass and the like which in thin sections have a surprising amount of flexibility.

The thin surface layer of brazing alloy may be formed in any suitable manner, but in the preferred method, the surface to be coated is covered with the brazing alloy in powdered form and heat is then applied. The brazing alloy upon melting flows into a relatively dense layer of uniform thickness which upon cooling strongly adheres to the surface in a fusion-bond, forming the novel laminated structure of this invention. Where the laminated structure is to be further worked as by drawing, bending or other shaping operations, it has now been found that a pickling of the brazing alloy surface in a bath containing an oxidizing agent, preferably nitric acid, greatly increases its ductility and workability, so that such shaping operations can ordinarily be accomplished without any deleterious cracking or flaking or the like of the layer of brazing alloy.

Before applying the layer of brazing alloy, it is necessary that the metal surface to be coated be free of any metallic oxides and foreign materials such as dust, oil or grease, chemical salts and the like. The surface may be cleaned in any suitable manner, for instance by employing any of the well-known pickling and degreasing operations employed for removing such metal oxides and foreign materials.

In the operation of applying the brazing alloy, in which elevated temperatures usually above the melting point of the alloy are employed for an extended period of time, it is necessary that the heating be carried out in an inert or slightly reducing atmosphere in order to avoid oxidation of the phosphorus content of the brazing alloy. Similarly, when the laminated structure of this invention is employed in a brazing operation, for instance by heating in a furnace, this heating operation must likewise be carried out in a non-oxidizing atmosphere to prevent oxidation of the phosphorus. In such operations as spot welding and the like, in which the metal is heated for only a very short period of time, it is not usually necessary to carry out the heating in a non-oxidizing atmosphere, since no harmful oxidation of the phosphorus ordinarily occurs in such very short heat treatments.

By way of example, following is a detail description of the preparation of a laminated metal sheet illustrating one embodiment of this invention.

A sheet of deoxidized copper about 0.020 inch thick, having its surface suitably cleaned, for instance by immersion in a degreasing bath of carbon tetrachloride or other suitable solvent and immersion in a pickling bath, containing about 10% sulphuric for about 15 minutes at a temperature of about 60° C. followed by thorough washing, is coated with an alloy composed of about 8.3% phosphorus and the balance substantially copper, in the form of powder, for instance having a particle size passing through a 200 or 250 mesh screen. About 45 grams of the brazing alloy powder is employed per square foot of the surface to be coated and the powder is disposed in a substantially uniform layer on the surface. This amount of brazing alloy provides a final layer of the alloy about 0.002 inch thick. More or less of the powder may be employed, depending on the thickness of the final layer of brazing alloy desired, and brazing alloy layers of from 0.001 to 0.003 inch thickness have been found entirely suitable for most purposes, although in some instances thicker or thinner layers may be employed.

The sheet may have any desired length and width, these dimensions being determined by the ultimate purpose for which the laminated structure is to be employed. For instance, the sheet may be in the form of relatively long strip which after coating with brazing alloy is used as such or is cut into the desired shapes, or the sheet may be in the form of squares, circles, triangles or other symmetrical shapes or irregular shapes prior to coating with the brazing alloy.

The powder-coated sheet, for instance as illustrated in Figure 1, with the sheet I and powdered brazing alloy 2, is then heated in a furnace having a slightly reducing atmosphere, for instance natural gas of high methane content for about 5 minutes at a temperature above the melting point of the brazing alloy, preferably in the range of about 715° C. to 780° C. The sheet is then cooled in a natural gas atmosphere until it is sufficiently cold that no oxidation occurs upon contact with atmospheric oxygen. At such elevated temperatures the particles of powder are melted and flow to form a uniform dense layer which upon cooling results in the formation of a laminated structure, for instance as illustrated in Figure 2 with the copper sheet I and the adherent thin layer of copper-phosphorus brazing alloy 3 joined thereto in a fusion-bond.

The laminated sheet so formed may without further treatment be readily united to copper-base metal, for instance, deoxidized copper, brass, bronze or the like, merely by heating in a suitable atmosphere with the laminated sheet having its brazing alloy surface in contact with the copper-base metal.

It is preferred, however, to first pickle the laminated sheet in a bath containing an oxidizing agent, in order to obtain the advantage provided by having a clean metal surface and to obtain the resulting increased ductility of the copper-phosphorus brazing alloy. This may be readily accomplished by immersing the laminated sheet in about a 50% solution of nitric acid for about one-half minute, or so, at room temperature and then washing the sheet to remove all traces of acid.

The novel laminated structure of this invention is of especial advantage in the fabrication of vessels and the like, in which complementary parts are assembled and united by brazing. For instance, as illustrated in Figure 4, the laminated sheet, prepared as described above, after pickling and washing may be pressed to form crisscross indentations such as 4 and 5. The indented sheet may then be joined to a second similarly indented sheet of copper-base metal, not having any surface coating of brazing alloy, merely by bringing the complementary parts together and heating in a non-oxidizing or preferably a reducing atmosphere so that the brazing alloy on surfaces 6 welds the parts together and thus forms a vessel-like structure suitable for heat interchangers, etc. Although no flux is essential for such a brazing operation with the copper-phosphorus brazing alloy, a suitable flux may be employed if desired when the surfaces are not clean.

Relatively complex metal structures may be readily fabricated, for instance employing steel, or other metal parts, clad with copper-base metal, merely by applying a layer of the copper-phosphorus brazing alloy to form the novel laminated structure of this invention and proceeding with the brazing operation as described above.

The copper-base metal upon which the layer of copper-phosphorus brazing alloy is applied may, as described in the specific example above, be composed solely of deoxidized copper, or it may be composed of any of the ordinary copper alloys such as brass, bronze, "nickel-silver," or, for instance, copper-iron or copper-iron-zinc alloys such as are described in U. S. Letters Patent No. 2,295,180, issued to E. G. Mitchell, September 8, 1942, or any other suitable copper alloy, and the term "copper-base metal" is used herein and in the claims in a sense inclusive of such metals and alloys as well as ferrous and other metal structures clad with any of such metals or alloys.

The copper-phosphorus brazing alloy employed may be any of the well-known copper-phosphorus brazing alloys, and may contain merely copper and phosphorus in suitable proportions, such as 2% to 10% phosphorus and preferably about 8.3%, or may contain additional ingredients for instance zinc, silver, silicon, cadmium, or indium, which may be utilized to modify and improve the characteristics of the alloy without destroying its effectiveness as a brazing medium.

Although the preferred method of forming the novel laminated structure consists in heating the brazing alloy in the form of a powder on the surface of the copper-base metal in a slightly reducing atmosphere, any other suitable method may be employed, for instance, the brazing alloy in molten condition may be poured or cast on the copper-base metal surface in a non-oxidizing atmosphere, or the copper-base metal may be dipped into the molten brazing alloy, or the copper-base metal may be dipped into or coated with fused compounds of phosphorus adapted to give up their phosphorus content and form copper-phosphorus alloy with the copper content of the surface of the copper-base metal, or, for instance, with a mixture of phosphoric acid and graphite, or the copper-base metal may be treated at elevated temperature with phosphorus in vapor form.

The copper-base metal may be completely covered with the brazing alloy, or may be in the form of a structure 1 having a layer of the brazing alloy 3 only on one side as illustrated in Figures 2 and 4, or as illustrated in Figure 3 may have the brazing alloy 3 on both flat surfaces.

Vessels and other articles fabricated by brazing, spot-welding, etc., employing the laminated structures of this invention have no tendency to open at the seams, the weld ordinarily having greater strength than the copper-base metal. Brazing operations are rendered relatively easy to manipulate, merely requiring that the parts be brought into contact and heated in a suitable atmosphere, thus eliminating all difficult handling of the brazing alloy and flux. The welds obtained are in general much better than when the brazing alloy is applied from a rod or inserted strip, since a uniformly adequate portion of the brazing alloy is available at all points where needed and any fillets between the parts are adequately filled to form good tight joints.

This invention accordingly provides a novel laminated structure which greatly facilitates the art of brazing and simplifies the fabrication of articles formed by joining copper-base metal parts. While the invention has been described in the foregoing with particular reference to the specific examples, it will be understood that these are illustrative and that variations may be made without departing from the spirit and scope of the invention, as expressed in the appended claims.

Having now described the invention, what is claimed as new and is desired to be secured by Letters Patent, is:

1. A composite laminated structure comprising a supporting sheet having a copper base and an exposed layer of copper-phosphorus brazing alloy in direct contact with and firmly bonded to one surface of said supporting sheet.

2. A composite laminated structure comprising a supporting sheet having a copper base and an exposed layer of an eutectic alloy of copper and phosphorus in direct contact with and firmly bonded to one surface of said supporting sheet.

3. A composite laminated structure comprising a supporting sheet having a copper base and an exposed layer of an alloy of 2% to 10% phosphorus with the balance being substantially copper in direct contact with and firmly bonded to one surface of said supporting sheet.

4. A sheet of copper-base metal having an exposed ductile thin layer of a copper-base phosphorus-containing brazing alloy in direct contact with and firmly bonded to one surface thereof, said sheet being adapted for further shaping operations.

5. A sheet of copper-base metal having an exposed ductile thin layer of a brazing alloy of 2% to 10% phosphorus with the balance being substantially copper in direct contact with and firmly bonded to one surface thereof, said sheet being adapted for further shaping operations.

6. A composite laminated sheet adapted for further shaping operations and for assembly with complementary parts to fabricate a welded structure by heating, comprising supporting sheeting having a copper base and an exposed ductile thin layer of a brazing alloy of 2% to 10% phosphorus with the balance being substantially copper in direct contact with and firmly bonded to one surface of said supporting sheeting.

7. A laminated metal sheet composed of a supporting layer of cold-workable copper-base metal and an exposed ductile thin layer of copper-phosphorus brazing alloy in direct contact and firmly bonded to one surface of said supporting layer.

8. A composite sheet adapted for further shaping operations and for assembly with complementary parts to fabricate a welded structure by heating, which comprises a supporting layer of cold-workable copper-base metal and an exposed ductile thin layer of an eutectic alloy of copper and phosphorus in direct contact with and firmly bonded to one surface of said supporting layer, said layer of the alloy of copper and phosphorus being co-extensive with the supporting layer of the copper-base metal.

EDMUND G. MITCHELL.
DE WILTON B. TIMBERMAN.

REFERENCES CITED

The following references are of record in the file of this patent:

UNITED STATES PATENTS

| Number | Name | Date |
| --- | --- | --- |
| 268,478 | Eitch | Dec. 5, 1882 |
| 296,074 | Shaw | Apr. 1, 1884 |
| 440,693 | Burdon | Nov. 18, 1890 |
| 951,952 | Lamp et al. | Mar. 15, 1910 |
| 1,651,709 | Jones | Dec. 6, 1927 |
| 1,652,107 | Eschholz | Dec. 6, 1927 |
| 1,923,514 | Stockfleth | Aug. 22, 1933 |
| 1,977,128 | Hawkins | Oct. 16, 1934 |
| 1,980,890 | Tompkins | Nov. 13, 1934 |
| 2,235,200 | Chace | Mar. 18, 1941 |
| 2,297,554 | Hardy | Sept. 29, 1942 |
| 2,323,666 | Medsker | July 6, 1943 |
| 2,372,155 | Bosch | Mar. 20, 1945 |
| 2,390,890 | MacFarland | Dec. 11, 1945 |